United States Patent [19]
Michael

[11] Patent Number: 5,517,829
[45] Date of Patent: May 21, 1996

[54] APPARATUS FOR PRODUCING FILTERED DRINKING WATER

[76] Inventor: Charles L. Michael, 7700 N. Aubrey La., North Richard Hills, Tex. 76180

[21] Appl. No.: 237,603

[22] Filed: May 3, 1994

[51] Int. Cl.⁶ .................................................. F25D 21/00
[52] U.S. Cl. .............................. 62/272; 62/3.4; 210/681; 210/669; 210/754; 210/764
[58] Field of Search .............................. 62/3.2, 3.4, 272, 62/390, 389, 394, 285, 288, 289, 291; 222/146.6; 210/669, 681, 683, 754, 764, 753

[56] References Cited

U.S. PATENT DOCUMENTS

| | | | |
|---|---|---|---|
| 3,040,538 | 6/1962 | Alsing | 62/3.4 |
| 3,462,363 | 8/1969 | Mills | 210/683 |
| 5,106,512 | 4/1992 | Reidy | 62/272 |
| 5,192,004 | 3/1993 | Burrows | 222/146.6 |
| 5,269,919 | 12/1993 | von Medlin | 210/669 |

*Primary Examiner*—John M. Sollecito

[57] ABSTRACT

Water vapor in the atmosphere is condensed on a condenser surface which is cooled either by a standard refrigeration system or by a thermoelectric system. Condensate water is treated by filtration and by the addition of a disinfectant, and the treated water is stored in a holding tank. Auxiliary water from a local source is treated similarly in a parallel system and stored in a second holding tank. As it is pumped from holding tank to a dispensing tap, treated water passes through a second water treatment which filters pyrogens and other bacterial residue from the water, and also removes residual disinfectant.

1 Claim, 3 Drawing Sheets

APPARATUS FOR PRODUCING FILTERED DRINKING WATER

CROSS REFERENCE TO RELATED APPLICATIONS

This application is related to application Ser. No. 08/118,293, filed Sep. 9, 1993, titled APPARATUS PROVIDING POTABLE WATER CONDENSED FROM AMBIENT AIR; to a Continuation-in-Part application based on the above application and having the same title; and to application Ser. No. 07/972,773, filed on Nov. 5, 1992, titled DISINFECTION-FILTRATION STORAGE SYSTEM FOR LOW-CONDUCTIVITY WATER now abandoned.

BACKGROUND OF THE INVENTION

1. Field of the Invention

This invention relates to devices for producing potable water, and specifically to devices for producing, treating, and storing water condensed from water vapor in air.

2. Description of the Related Art

As population density increases across the face of the earth, often in areas without reliable water supplies, the provision of potable water becomes an increasingly pressing problem. Previous inventions, including those of the present applicant, have addressed the problem of condensing water vapor in the ambient air to provide a source of potable water. To increase its usefulness, such condensation apparatus generally has means for storing water prior to use; this storage is commonly a holding tank.

Storage of water in a holding tank leads to an additional problem regarding biological contaminants in the stored water. The most obvious source of these contaminants is the air from which the water vapor is condensed; large quantities of air must be drawn through the condensing apparatus. Those organisms which prosper in fresh water will of course multiply in the holding tank, so that after some length of time the stored water may become unpalatable or unfit to drink.

Of previous U.S. patents addressing this problem, Topper discloses a method of decontaminating distilled water by heat and by a system of baffles to remove contaminants from the water vapor. Engel et al. disclose an air filter to remove contaminants from air being pulled across the condenser coils. Reidy discloses air filters and non-reusable water filters. Chang, et al., disclose crystallizing water by freezing to remove impurities, then melting the purified water. Braaten and Sakamoto also disclose purification by freezing.

Applicant is aware of the following U.S. patents, which include those mentioned in the preceding paragraph:

| U.S. Pat. No. | Issue Date | Patentee |
| --- | --- | --- |
| 5,259,203 | Nov. 9, 1993 | Engel, et al. |
| 5,233,843 | Aug. 10, 1993 | Clarke |
| 5,227,027 | July 13, 1993 | Topper |
| 5,212,957 | May 25, 1993 | Ruff |
| 5,207,761 | May 4, 1993 | Ruff |
| 5,182,291 | Feb. 2, 1993 | Yan |
| 5,168,728 | Dec. 8, 1992 | Djelouah, et al. |
| 5,149,446 | Sep. 22, 1992 | Reidy |
| 5,123,948 | June 23, 1992 | Ruff |
| 5,103,653 | Apr. 14, 1992 | Ruff |
| 4,954,151 | Sep. 4, 1990 | Chang, et al. |
| 4,742,691 | May 10, 1988 | Kennedy |
| 4,572,785 | Feb. 25, 1986 | Braaten |
| 4,262,489 | Apr. 21, 1981 | Sakamoto |
| 4,140,150 | Feb. 20, 1979 | Rundell |
| 3,675,442 | Jul. 11, 1972 | Swanson |
| 3,498,076 | Mar. 03, 1970 | Michael |
| 3,035,418 | May 22, 1962 | Wright |
| 2,499,982 | Mar. 7, 1950 | Suiter |

SUMMARY OF THE INVENTION

Progressive Contribution to the Art

The present invention fills the need described above for a drinking water unit which will produce, treat, and safely store good-tasting drinking water. This invention specifically is designed to be used in home or office, where it is installed within a cabinet or cupboard space.

The invention includes means for producing water by condensing water vapor in air, then treating the water to destroy any organisms therein, storing the treated water, and then filtering the water before it is dispensed to remove both the treatment chemicals and any pyrogens including dead bodies of germs, bacteria, and viruses killed by the initial treatment. There is also a provision for connecting an auxiliary water supply for times when demand on the unit exceeds its production rate, as might occur during periods of very low humidity, heavy usage, etc. Auxiliary water goes through a separate treatment system, similar to or identical to the treatment system for condensate water, and is stored in a separate holding tank. Dispensing of auxiliary water is responsive to a mechanism which senses the water level in the storage tank for the condensate water. When the level in the condensate water tank reaches a lower limit, the water-level sensor electrically operates a valve to switch the dispensing faucet(s) from the condensate water tank to the auxiliary water tank.

The means for condensing water from outside air or from ambient air include an air conduit from the outside wall of the building in which the water generator is installed. Outside air is drawn by a fan through the air conduit into the condensing apparatus. A compressor-type refrigeration unit or a thermoelectric refrigeration unit cools air below its dew point. Condensate in the form of liquid water drips from the cool condenser surfaces into a collecting funnel which channels the water toward the storage tank. En route to the storage tank, a disinfectant such as a halogen is introduced into the water by a first treatment means; the disinfectant remains in the water during storage. The post-storage treatment includes filtration and disinfectant removal. This is accomplished in a multi-stage filter unit, in which water-permeable nylon disks separate compartments within the filter housing. The filtration compartments include one containing garnet gravel, one containing a resin to combine with and remove the halogen from the water, one containing silica sand, one filled with activated charcoal, and next to the outlet a micropore filter of plastic mesh.

Stored water from either tank is dispensed through a tap at room temperature, or is first heated and then dispensed through a hot-water tap, or is first chilled and then dispensed through a chilled-water tap.

Objects of this Invention

An object of this invention is to furnish an apparatus which provides drinking water in a home or office setting without requiring connection to plumbing.

Another object of this invention is to produce good-tasting drinking water of good quality from a compact apparatus which will readily fit into the space available in a kitchen cabinet.

A further object is to provide drinking water which is free of any purification chemicals and in addition is free of any bacterial cysts resulting from the purification process.

A further object is to provide a device which will provide drinking water immediately upon installation.

Another object is to provide a supply of water which is dispensed at room temperature, heated, or chilled.

Further objects are to achieve the above with devices that are sturdy, compact, simple, safe, efficient, ecologically compatible, energy conserving, and reliable, yet inexpensive and easy to manufacture, install, operate, and maintain.

The specific nature of the invention, as well as other objects, uses, and advantages thereof, will clearly appear from the following description and from the accompanying drawings, the different views of which are not necessarily scale drawings.

DESCRIPTION OF THE PREFERRED EMBODIMENTS

Figure 1:
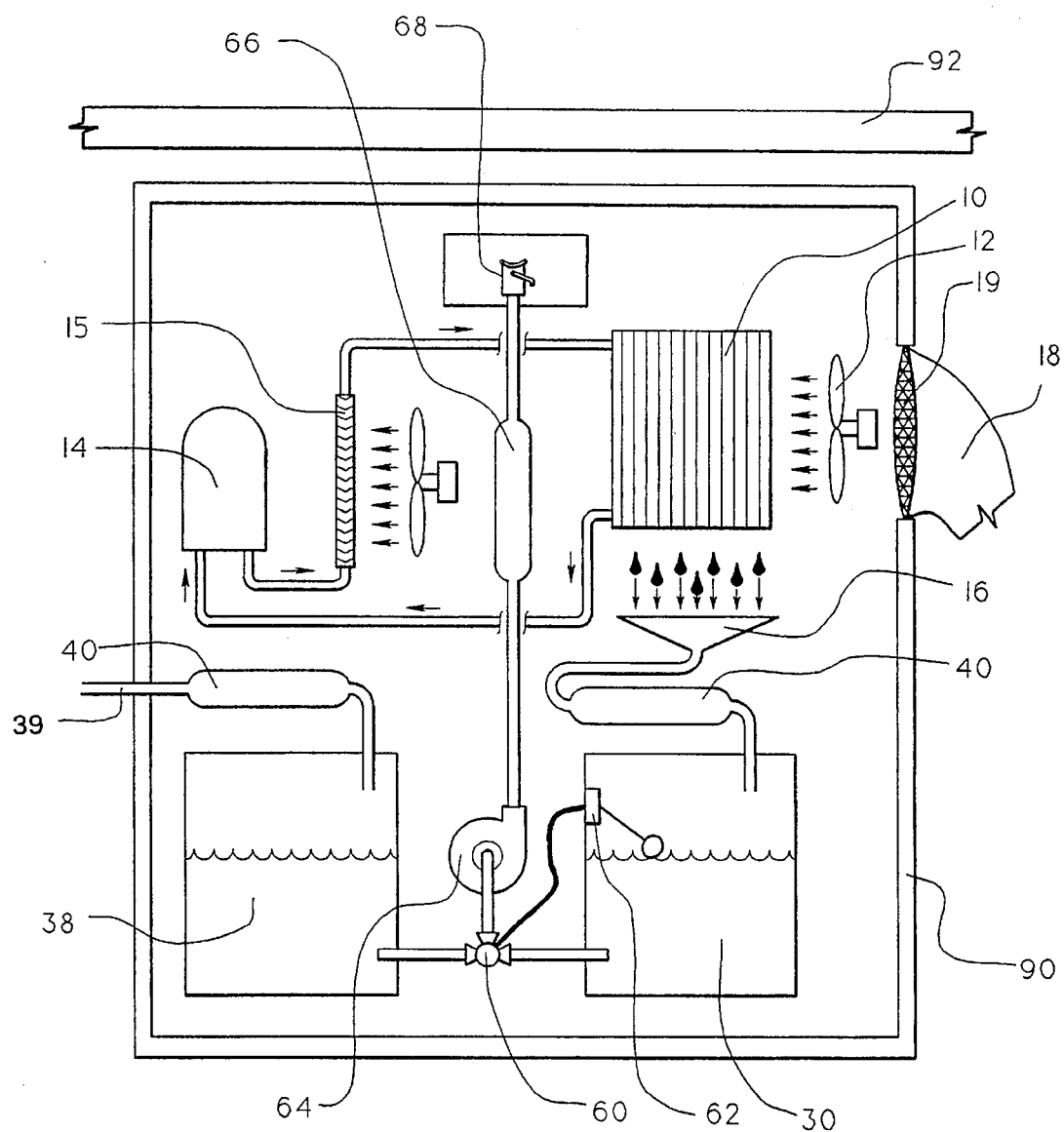
FIG. 1 is a frontal elevation of the water condensing apparatus, showing a compressor-type refrigeration system.

Referring to the drawings, FIG. 1 illustrates the components of the water producing unit 90, installed under counter-top 92. Condensing surface 10 is the outer surface of a refrigeration unit evaporator, and is cooled by a refrigerant circulated within the evaporator. Alternatively, the condensing surface 10 is the surface of a separate component which houses and is cooled by the refrigeration unit evaporator. FIG. 1 shows a mechanical compressor-type refrigeration unit having compressor 14 and condenser 15.

Outside air is drawn through duct 18 and across the condensing surface by a fan 12. Removable filter 19 captures much of the dust and other airborne solid matter from the air before the air moves across the condensing surface. Where it is preferred to use room or ambient air rather than outside air, duct 18 opens into the room rather than to the outside. Generally, air brought in from the outside will be discharged to the outside, and air brought into the unit from within the room will be discharged back into the room.

Air passing near the condensing surface is cooled below its dew point. Condensate, i.e., liquid water, then collects on the condensing surface 10 from which it drips into a drain funnel 16.

Figure 2:
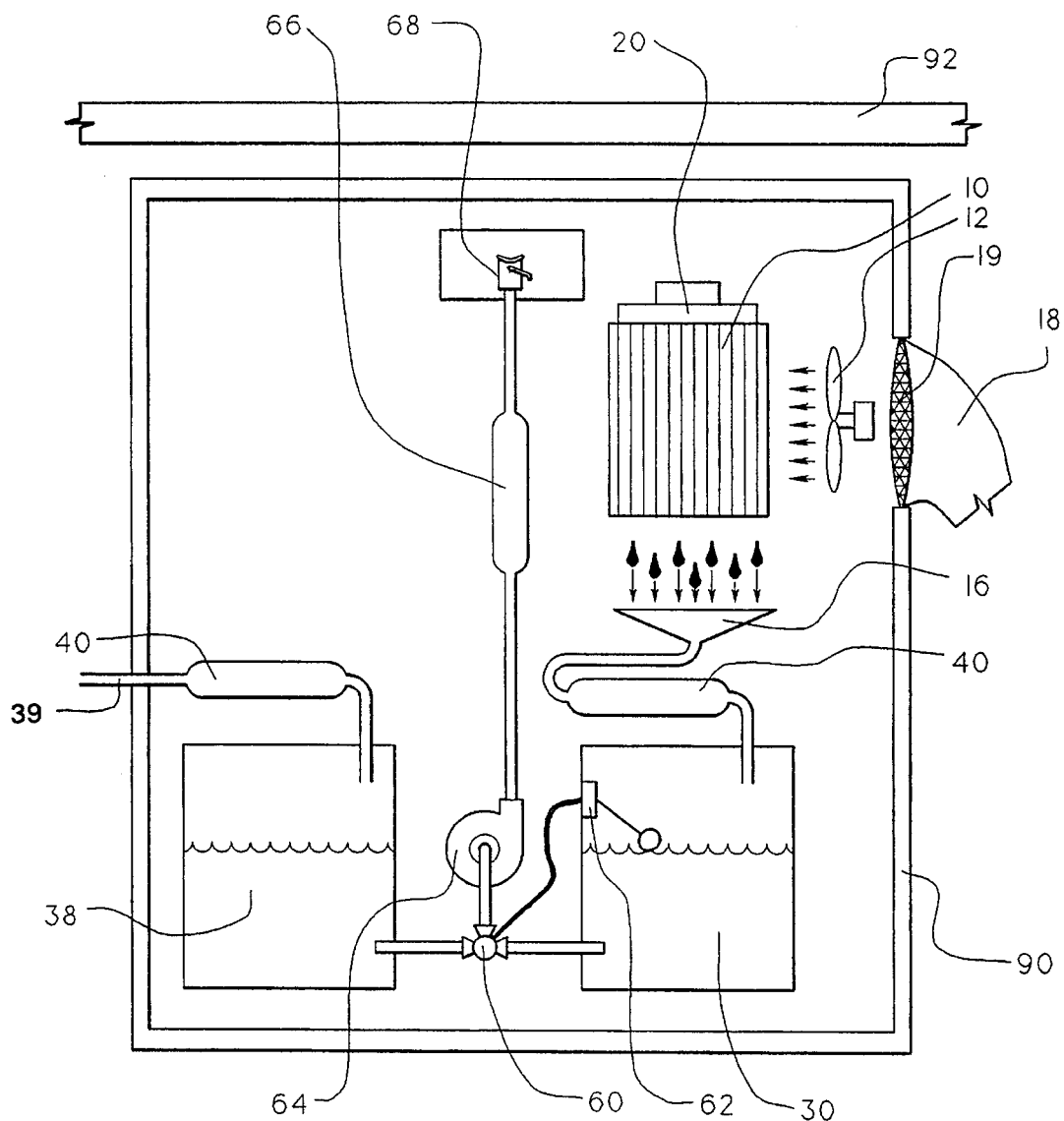
FIG. 2 is a frontal elevation showing a thermoelectric refrigeration system.

In another embodiment, the condensing surface 10 is cooled by a thermoelectric cooler 20, illustrated in FIG. 2. As used herein, a thermoelectric cooler or thermoelectric cooling system is defined as a solid-state semiconducting device which moves heat energy from a heat source (a body to be cooled) to a heat sink.

Water captured by the drain funnel 16 drains into a conduit leading to a storage tank 30. Integral with the conduit is a removable first means for treating water, which includes a first treatment unit 40. The first treatment unit 40 includes a cylindrical housing having an inlet and an outlet. Inside the housing of the first treatment unit is a filter which removes particulate matter from the water.

Incorporated into the first means for treating water is a means for introducing a disinfectant into the water flow. Within the housing is a compartment containing a medium which releases a disinfectant into the water. At present, iodine is the preferred disinfectant. Iodine is preferred because the disinfectant remains in the water during storage to inhibit the growth of organisms in the water. Iodine will not readily evaporate from the water and will remain effective as a disinfectant. Other halogens which may be used are suitable disinfectants include bromine and chlorine, although chlorine will more readily escape from the water. As described below, the disinfectant is removed from the water prior to dispensing for use.

Introduction of the halogen disinfectant is accomplished by dissolution of a halogen from a halogen-impregnated medium such as a resin. Alternatively, the halogen is released into the water by the dissociation of a halogen compound such as a peroxide containing chlorine. In either application, the medium or the compound which releases the halogen is contained within the first treatment unit 40. Where the halogen is iodine, preferred concentrations of iodine in water are two (2) parts per million to ten (10) parts per million. A rate of release from the halogen compound or other medium is determined by: the available surface area of the medium; the concentration of iodine in the medium; and/or the rate of dissolution of the medium.

After passing through the first water treatment means 40, the water is guided through the remainder of the conduit to holding tank 30. It is contemplated that a separate chilled-water tank will be located within holding tank 30. A refrigerant line containing cold refrigerant from the refrigeration unit will pass through the smaller, separate tank to chill the water therein. Thus the same refrigeration unit is used to cool the condenser surface on which water vapor condenses, and to chill water in the chilled water tank.

Where a chilled-water tank is incorporated into the unit, the refrigeration unit and the outside-air fan may operate in either of two modes. Where the water level in the holding tank 30 is low, the refrigeration unit and the outside air fan 12 both operate in order to condense additional water and to chill the water produced. Where the water level in the holding tank is high, i.e., no additional water is needed, the refrigeration unit operates without the outside air fan. In this mode, little or no water is produced, while the refrigerant cools water in the chilled-water tank.

An auxiliary supply of water is provided by auxiliary water line 39. This line is a conduit connected to a local source of water, and supplies water to a separate treatment system. The auxiliary water supply, after treatment, is stored in auxiliary storage tank 38. Auxiliary valve 60 is an electrically operated valve, and is controlled by water level sensor 62. When the water level in the condensate water tank 30 reaches a predetermined low level, a float causes the sensor switch to close and complete a circuit to operate auxiliary supply valve 60. In its operated position the valve closes the output from the first storage tank so that only auxiliary water from the second storage tank is dispensed; the output line for condensate water from the first storage tank is closed. In its normal position, i.e. when the water level is not low in the first storage tank, the outlet line from the first storage tank is open so that condensate water is dispensed from the faucet.

Water is moved by a low-volume pump 64 from one of the tanks to a dispensing tap 68 by first going through the valve 60, then through the second treatment means described below, to the dispensing tap or spigot 68.

Where a chilled water tank is used, chilled water will flow from the chilled water tank via a chilled water conduit to a chilled water tap. Integral with the chilled water conduit is a second water treatment means as described below. In this embodiment there are two units of the second water treatment means; one is installed in the chilled water conduit, and another in a room-temperature water conduit which connects to the main storage tank.

Where heated water is desired, a thermostatically-controlled, in-line water heater is used to heat water from the main tank which is then dispensed through a heated-water tap.

Second water treatment means is a multi-stage assembly 66 which filters pyrogens and residual organic matter, including bodies of germs and bacteria killed by the disinfectant, from the water. The initial filtering stage is a layer 50 of garnet gravel or the like, which is succeeded by a halogen-binding resin 52. The resin binds with halogens such as iodine in the water by a chelating or other type of chemical reaction to remove the traces of disinfectant from the water. Next comes silica sand 54, another filtering medium. The third filtering agent is activated charcoal 56.

Filtering of bacterial cysts is accomplished by a micropore filter 58. A micropore filter, as used herein, is a filter having pore spaces measured in microns, with a mesh small enough to trap bacterial bodies and the like. The micropore filter is the last stage in the second water treatment means; from the filter the water moves to the outlet of the filter housing.

Figure 3:
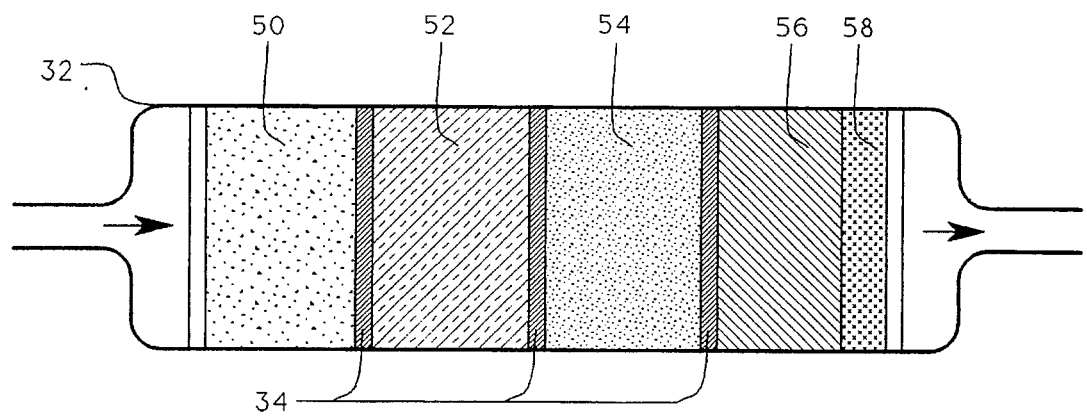
FIG. 3 is a detail of the second water treatment means, showing a concentric arrangement of the chambers.

The second water treatment means may be in either of two configurations. Referring to FIG. 3, the second water treatment means is a cylindrical housing 32 having an inlet and an outlet. The chamber inside the cylindrical housing is partitioned into compartments. In one embodiment, shown in FIG. 3, the inlet and outlet are at opposite ends of the housing 32 and are arranged sequentially. In this embodiment water-permeable nylon disks 34 are spaced apart within the housing to divide the chamber inside the housing into compartments. The compartments contain the filtration and halogen-binding media described in the preceding paragraphs.

Figure 4:
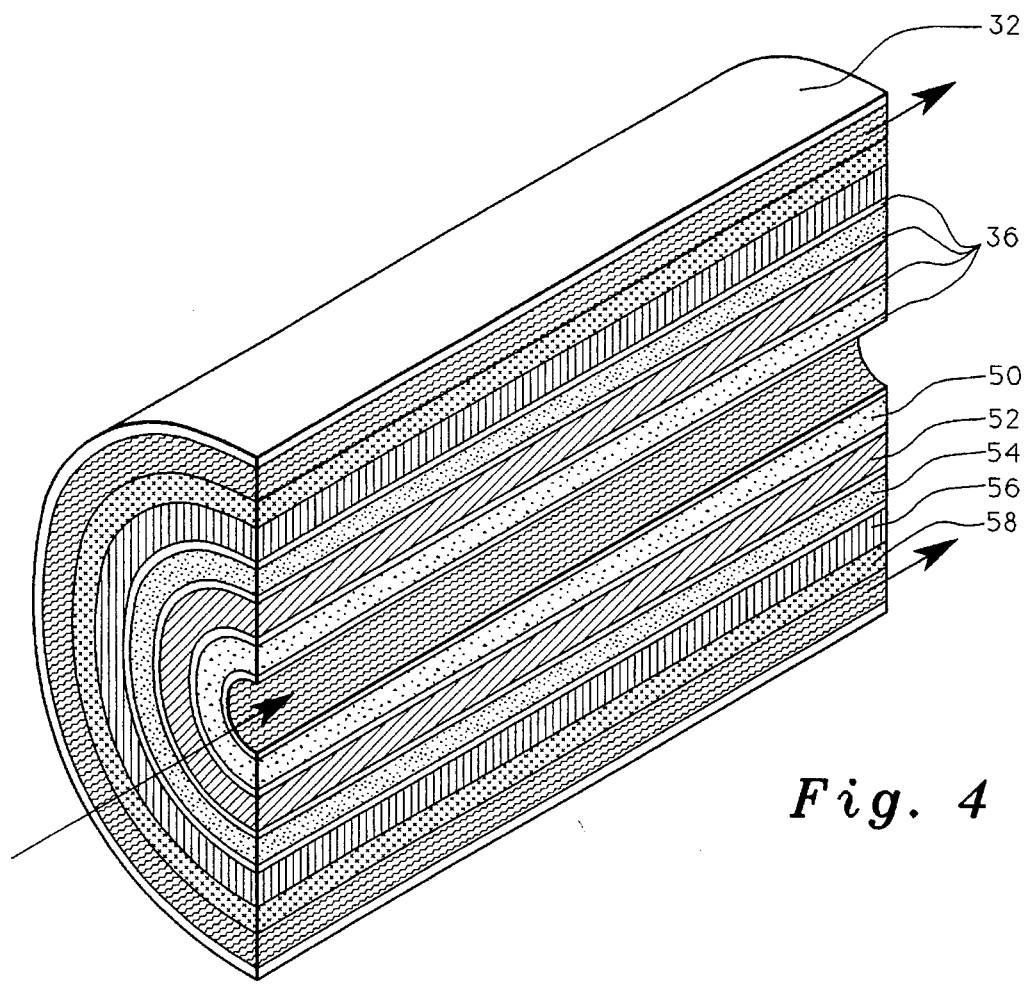
FIG. 4 is a detail of the second water treatment means, showing a linear arrangement of the chambers.

In another embodiment shown in FIG. 4, the water-permeable nylon is arranged in concentric layers 36 so that the chamber inside the housing is divided into cylindrical compartments. The flow through this unit is outward from an axially-located inlet, through the various concentric layers, to an outlet located near the perimeter of the housing. The second water treatment means is a detachable, replaceable unit which is removed and disposed of when clogged.

If a chilled water conduit and dispensing tap is associated with the system, a second water treatment unit is connected in line with both the chilled water conduit and the room-temperature water conduit. Thus, water flowing through either conduit flows through an individual second treatment unit.

The embodiments shown and described above are only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A potable water supply system, comprising:
   a) means for producing water by condensing water vapor in air,
   b) first means for treating water,
   c) means for storing treated water,
   d) second means for treating water to remove a residue of a first treatment,
   e) means for dispensing treated water,
   f) said means for producing water being an apparatus having dimensions and a configuration suitable for installation within a kitchen cabinet,
   g) said apparatus including means for moving outside air through the apparatus,
   h) a condensate water treatment apparatus,
   j) an auxiliary water treatment apparatus,
   k) a first storage tank for storing treated condensate water,
   l) a second storage tank for storing treated auxiliary water,
   m) means for supplying auxiliary water to said auxiliary water treatment apparatus,
   n) said means for supplying auxiliary water responsive to a water level in said first water storage tank,
   p) said second means for treating water further comprises a filter having a housing with an inlet and an outlet,
   q) said housing having water-permeable nylon partitions spaced apart within said housing to define compartments within said housing,
   r) a compartment containing garnet gravel,
   s) a compartment containing a material to remove said disinfectant from the water,
   t) a compartment containing silica sand,
   u) a compartment containing activated charcoal, and
   v) a micropore filter of plastic mesh adjacent said outlet, so that water enters the filter through the inlet, passes through said compartments and the micropore filter, and leaves the filter through the outlet.

* * * * *